(No Model.)
J. POLLOCK.
CONVEYER CHAIN.
No. 505,296.  Patented Sept. 19, 1893.
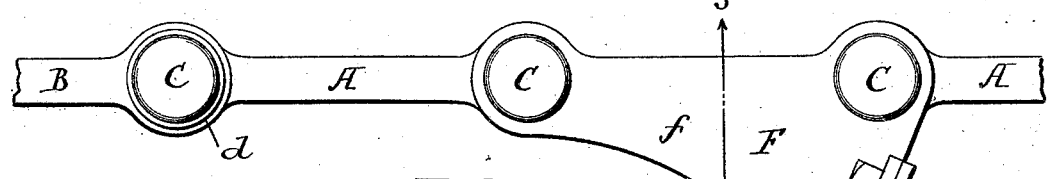
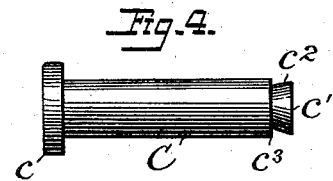
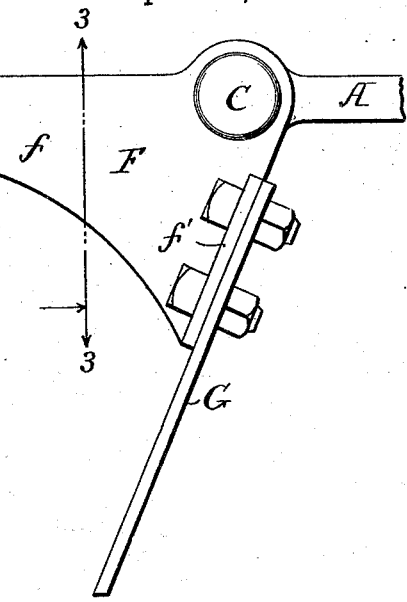
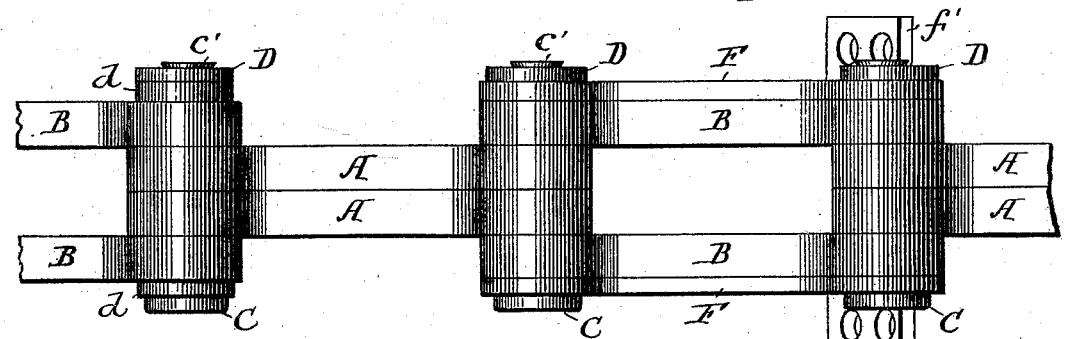
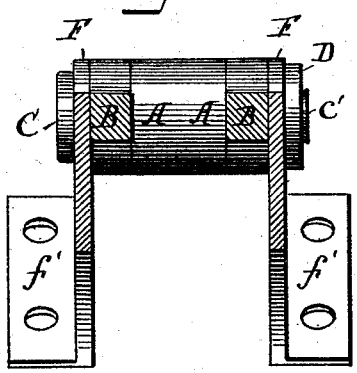
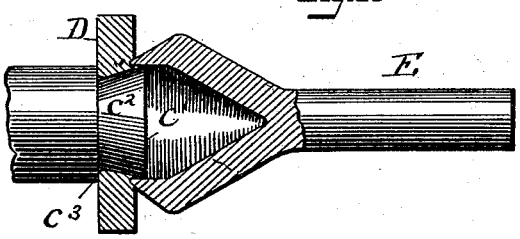

UNITED STATES PATENT OFFICE.

JAMES POLLOCK, OF WILKES-BARRÉ, PENNSYLVANIA.

CONVEYER CHAIN.

SPECIFICATION forming part of Letters Patent No. 505,296, dated September 19, 1893.

Application filed September 21, 1891. Serial No. 406,396. (No model.)

*To all whom it may concern:*

Be it known that I, JAMES POLLOCK, a citizen of the United States, residing at Wilkes-Barré, in the county of Wyoming and State of Pennsylvania, have invented certain new and useful Improvements in Conveyers, of which the following is a specification.

My invention relates to conveyer chains such as are used for conveying, elevating and handling coal, ores, clay, grain, or other material, either loose or in packages; and it consists in a novel construction which will be hereinafter fully described.

In the accompanying drawings, in which like reference signs refer to like parts throughout the several views, Figure 1 is a side elevation of a part of my improved chain showing one of the flights and its supports. Fig. 2 is a plan view of the same with the flight removed. Fig. 3 is a section on the line 3—3 of Fig. 1 looking in the direction of the arrow. Fig. 4 is a side view of one of the connecting pins, and Fig. 5 illustrates one mode of fastening the retaining washer upon the end of the pin.

The objects of my invention are to produce a chain suitable for conveyers which is extremely light and durable in proportion to its strength and to provide convenient means for attaching flights or buckets to the chain.

In the accompanying drawings I have shown, to illustrate my invention, a chain provided with flights composed of rectangular plates which are adapted to run in a trough of similar rectangular cross section for the purpose of carrying forward the material to be conveyed.

In carrying out my invention the various parts of the chain, excepting the washers, which I will hereinafter describe, are preferably formed from soft steel, and then tempered to the desired hardness before assembling them to form the completed chain. The links A, B, are preferably punched from a steel plate of suitable thickness, their dimensions being such that they will be equally strong at all points, thus avoiding any waste of material. The pins C which unite the links are preferably formed of rolled steel and afterward tempered, their cross section being such as to resist a shearing strain equal to the tensile strength of the links.

The preferred shape of the pins C is best illustrated in Fig. 4. Each pin is provided with a head $c$ at one end, larger than the body and a cylindrical body equal in length to the combined thickness of the links at the joints. The end opposite the head $c$ is formed with a head $c'$ in diameter equal to or smaller than the body and separated from the body by a circumferential groove forming reduced portion or neck $c^2$. The head $c'$ is preferably tapered toward the body, as shown, thus forming a shoulder $c^3$.

The links are preferably assembled as shown in the drawings each alternate pair of links A being placed side by side and the remaining pairs of links being separated and one placed on each side of the links A. The pins C pass entirely through the chain and their heads and necks project beyond. To retain the pins in position I pass a ring or washer D of wrought iron or other malleable metal over the head $c'$ and with a suitable swage or setting tool E crowd the metal of the washer inward until it fits snugly around the reduced portion or neck and against the shoulder $c^3$. By assembling the chain as above outlined I am enabled to use tempered or hardened pins and links, which are the wearing parts, and at the same time to hold them as securely together as if the pins were made of soft metal and headed after assembling according to the common practice. The brackets F for the conveyer flights are also preferably formed by punching out suitably shaped pieces from steel plates which are afterward bent to the required form and tempered. As shown in the drawings each bracket consists of a substantially triangular plate $f$ shaped at its upper edge to conform to the outline of the links, with corresponding holes for the passage of the pins, and having outwardly bent wing portions $f'$ provided with bolt-holes for the attachment of the plates G composing the flights. It will be evident that the flights G may be arranged at any desired angle to the line of the chain, though I prefer to arrange the forward side of the flight at an angle somewhat less than ninety degrees with said line, as shown most clearly in Fig. 1, for the reason that I find that such an arrangement will give greater efficiency to the conveyer than flights arranged at right angles to the chain. The brackets F are placed upon either side of the chain, preferably corresponding with a pair of outer links, B, and fastened in place by means of washers D as heretofore described. The pins C may be made all of the same length, if desired, the extra length where brackets are not used being taken up by washers $d$ equal in thickness to the brackets.

While I have shown, to illustrate my invention, my preferred embodiment thereof, it will be evident that the mechanical details may be somewhat varied without departing from the spirit of the invention. Thus for instance the head $c'$ may be differently shaped, it being sufficient that a neck or reduced portion be formed within said head to receive the ring or washer although I prefer the inwardly tapered head above described.

Having described my invention, what I claim, and desire to procure by Letters Patent, is—

In a conveyer chain the combination with the perforated links A B, the connecting pins C, and malleable metal washers D, of brackets arranged upon the pins C parallel with the links and each provided with an outwardly bent wing portion perforated for attachment to a flight or bucket, substantially as described.

In testimony whereof I affix my signature in presence of two witnesses.

JAMES POLLOCK.

Witnesses:
WM. C. PRICE,
B. R. JONES.